US005382388A

United States Patent [19]

Ehrhardt et al.

[11] Patent Number: 5,382,388

[45] Date of Patent: Jan. 17, 1995

[54] PROCESS FOR THE PREPARATION OF RHENIUM-188 AND TECHNETIUM-99M GENERATORS

[75] Inventors: Gary J. Ehrhardt, Columbia; Robert G. Wolfangel; Edward A. Deutsch, both of St. Louis, all of Mo.

[73] Assignees: Curators of University of Missouri, Columbia; Mallinckrodt Medical, Inc., St. Louis, both of Mo.

[21] Appl. No.: 933,385

[22] Filed: Aug. 21, 1992

[51] Int. Cl.[6] ........................ C09K 11/00; C09K 3/00; B01J 13/00

[52] U.S. Cl. .................................. 252/635; 252/634; 252/645; 252/315.01; 423/2; 423/606

[58] Field of Search .................... 423/2, 606; 252/645, 252/634, 635, 315.01

[56] References Cited

U.S. PATENT DOCUMENTS

| | | | |
|---|---|---|---|
| 3,846,341 | 11/1974 | Courty | 502/302 |
| 3,928,233 | 12/1975 | Young | 252/455 Z |
| 3,980,709 | 9/1976 | Kubo | 252/470 |
| 4,000,085 | 12/1976 | Courty et al. | 252/313.1 |
| 4,012,340 | 3/1977 | Morimoto | 252/465 |
| 4,141,861 | 2/1979 | Courty et al. | 252/313.1 |
| 4,280,053 | 7/1981 | Evans et al. | 250/432 |
| 4,738,834 | 4/1988 | Moore et al. | 423/2 |
| 4,778,672 | 10/1988 | Deutsch et al. | 424/1.1 |
| 4,859,431 | 8/1989 | Ehrhardt | 423/2 |
| 4,916,103 | 4/1990 | Martan et al. | 502/212 |
| 4,990,787 | 2/1991 | Vanderheyden et al. | 250/432 PD |
| 5,053,186 | 10/1991 | Vanderheyden et al. | 423/2 |
| 5,145,636 | 9/1992 | Vanderheyden et al. | 376/189 |
| 5,186,913 | 2/1993 | Knapp et al. | 423/2 |

FOREIGN PATENT DOCUMENTS 515808 1/1980 Australia .

OTHER PUBLICATIONS

R. E. Boyd, Technetium-99m Generators—The Available Options, pp. 801–809, 1982.

J. V. Evans, P. W. Moore, M. E. Shying & J. M. Sodeau, Zirconium Molybdate Gel As A Generator for Technetium-99m—I. The Concept and its Evaluation, pp. 19–29, 1987.

G. J. Ehrhardt, A. R. Ketring, T. A. Turpin, M-S. Razavi, J-L. Vanderheyden, F-M. Su, A. R. Fritzberg, Technetium and Rhenium in Chemistry and Nuclear Medicine (A Convenient Tungsten-188/Rhenium-188 Generator for Radiotherapeutic Applications Using Low Specific Activity Tungsten-188), pp. 631–634.

K. Bohme and H-D. Braner, Generation of Singlet Oxygen from Hydrogen Peroxide Disproportionation Catalyzed by Molybdate Ions, pp. 3468–3471, 1992.

Q. J. Nin and C. S. Foote, Singlet Molecular Oxygen Generation from the Decomposition of Sodium Peroxotungstate and Sodium Peroxomolybdate, pp. 3472–3476, 1992.

*Primary Examiner*—Edward A. Miller
*Attorney, Agent, or Firm*—Senniger, Powers, Leavitt & Roedel

[57] ABSTRACT

Process for preparing a radionuclide generator for producing Tc-99m or Re-188. A clear solution containing a metallic cation and an anion comprising W-188 or Mo-99 is provided. The metallic cation is present in the solution as a dissolved complex of the metallic cation and a complexing agent and/or the anion being present in the solution as a dissolved complex of the anion and a complexing agent. The dissolved complex(es) are decomposed to form a slurry containing a precipitate of the metallic cation and the anion. The precipitate is transferred to an elutable container of a radionuclide generator.

20 Claims, 1 Drawing Sheet

PROCESS FOR THE PREPARATION OF RHENIUM-188 AND TECHNETIUM-99M GENERATORS

BACKGROUND OF THE INVENTION

This invention relates to tungsten-188/rhenium-188 and molybdenum-99/technetium-99m generators, and more particularly to a process for their preparation.

Technetium-99m and rhenium-188 are important radionuclides, used in diagnostic and therapeutic applications in hospitals and other establishments. Several generators which separate the daughter radionuclide, technetium-99m, from its parent radionuclide, molybdenum-99, and the daughter radionuclide, rhenium-188, from its parent radionuclide, tungsten-188, have been described in the literature and/or have been commercially available.

Chromatographic generators, such as those used to produce Tc-99m from Mo-99, typically contain insolubilized parent radionuclide adsorbed onto a bed or column of material such as alumina for which the daughter has relatively little affinity. The daughter radionuclide, which forms from decay of the parent, is then periodically eluted from the column, for example, using physiological saline.

Many Tc-99m generators currently in use utilize Mo-99 produced by the fission of highly enriched U-235 targets. Fission Mo-99 has extremely high specific activity, i.e., >10,000 Ci/gram. Multicurie amounts of Mo-99 can thus be adsorbed on very small alumina columns (i.e., 1–1.5 grams of alumina) which can be efficiently eluted to obtain high concentrations (i.e., >1 Ci Tc-99m) in low volumes (i.e., less than 2–5 mL) of eluate. However, fission of U-235 results in the production of large quantities of gaseous and solid radioactive materials of many elements—a burdensome and costly waste management issue.

Although it is possible to produce Mo-99 via neutron bombardment of natural Mo-98 targets, this $(\eta,\gamma)$ reaction produces low specific activity (e.g., approximately 2.5 Ci/gram) Mo-99. Generators made with such low specific activity Mo-99 require substantially larger columns which, in turn, require increased volumes of eluant. The resulting Tc-99m solution contains undesirably low concentrations of Tc-99m in large volumes.

In U.S. Pat. No. 4,280,053, Evans et al. describes a Tc-99m generator containing zirconium molybdate ($ZrOMoO_4$) gel prepared from $(\eta,\gamma)$ Mo-99. The gel is prepared by dissolving Mo-99 in a slight excess of aqueous ammonia or sodium hydroxide solution. Acid is added to adjust the pH to between 1.5 and 7 and the resultant solution is added to a stirred aqueous solution of zirconium. A molybdate precipitate is formed. The precipitate is collected by filtration or evaporation of the liquid, air-dried and then sized for use in a generator.

In U.S. Patent 4,859,431, Ehrhardt describes a process for the preparation of zirconium tungstate ($ZrOWO_4$) gel generators. Irradiated tungsten trioxide is dissolved in a heated basic solution and added to an acidic zirconium-containing solution to form an acidic slurry in which a zirconyl tungsten precipitate forms. The slurry is neutralized using a basic solution, the precipitate is filtered, washed several times, dried, crushed and transferred to a generator column.

The processes described by Evans et al. and Ehrhardt for the preparation of zirconium molybdate gels and zirconium tungstate gels are not, however, without limitations. After the acidic slurry is formed, the pH must be adjusted, the slurry must be filtered and washed, and the dried precipitate must be crushed to the desired particle size. It is technically difficult to produce commercial quantities of highly radioactive zirconium molybdate gels and zirconium tungstate gels using these many and varied steps.

SUMMARY OF THE INVENTION

Among the objects of the present invention, therefore, may be noted the provision of a process for the preparation of gels containing $(\eta,\gamma)$ Mo-99 or $(\eta,\gamma)$ W-188, the provision of such a process in which the pH adjustment step is eliminated, the provision of such a process in which the slurry need not be filtered, and the provision of such a process in which the slurry need not be crushed to the desired particle size.

Briefly, therefore, the present invention is directed to a process for preparing gels containing $(\eta,\gamma)$ Mo-99 or $(\eta,\gamma)$ W-188 from a substantially clear solution containing a metallic cation and an anion comprising W-188 or Mo-99. The metallic cation is present in the solution as a component of a dissolved complex comprised of the metallic cation and a complexing agent and/or the anion is present in the solution as a component of a dissolved complex of the anion and a complexing agent. The dissolved complex(es) are decomposed to form a slurry containing a precipitate of the metallic cation, and the precipitate is collected to provide a substantially insoluble gel.

The present invention is additionally directed to a process for preparing a radionuclide generator for producing Tc-99m or Re-188. The process comprises providing a solution containing a metallic cation and an anion comprising W-188 or Mo-99. The metallic cation is present in the solution as a component of a dissolved complex comprised of the metallic cation and a complexing agent and/or the anion is present in the solution as a component of a dissolved complex of the anion and a complexing agent. The dissolved complex(es) are decomposed to form a slurry containing a precipitate of the metallic cation and the anion and the precipitate is transferred to an elutable container of a radionuclide generator.

Other objects will be in part apparent and in part pointed out hereinafter.

DETAILED DESCRIPTION OF THE PREFERRED EMBODIMENTS

Figure 1:
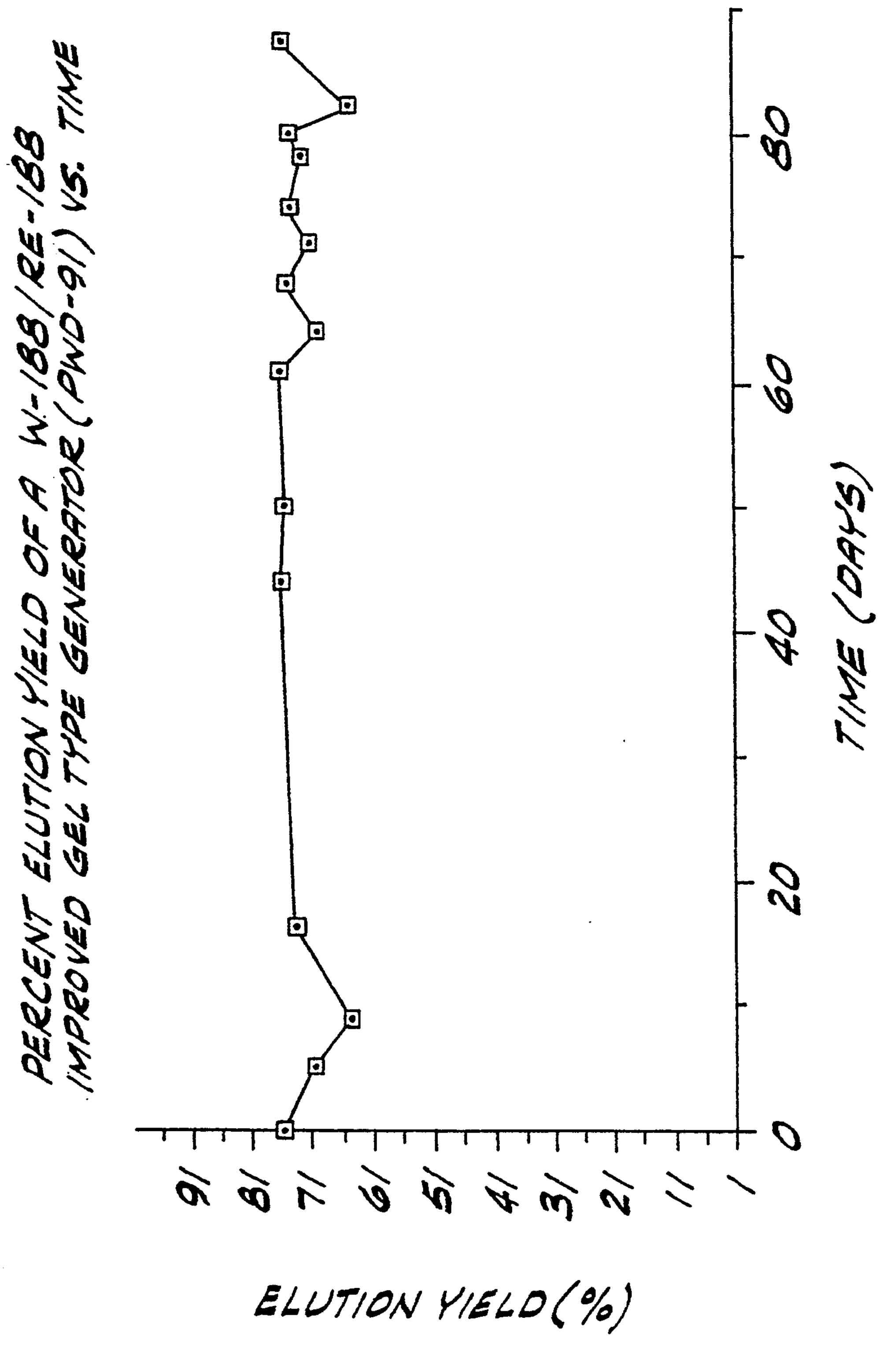
FIG. 1 is a plot showing the percent elution yield of the generator of Example 1 versus time.

As used herein, the term "complex" shall mean a coordination complex ion or coordination complex compound and the term "complexing agent" shall mean a composition which is a source of coordinating groups or ligands. The term "substantially clear solution" shall mean a solution which is clear to slightly hazy and which contains no precipitate.

The present invention provides a process for preparing substantially insoluble gels containing Mo-99 or W-188 which are permeable to diffusion of Tc-99m or Re-188 in the form of the pertechnetate ion ($TcO_4^-$) and the perhenate ion ($ReO_4^-$), respectively. Advantageously, the Mo-99 or W-188 of the gel may be a low specific activity product formed by irradiation of a $^{186}W$ tungsten target or a $^{98}MO$ molybdenum target at high neutron flux levels using, for example, a 10 megawatt nuclear reactor.

In addition to low specific activity Mo-99 or W-188, the substantially insoluble gel also comprises a metallic cation. Zirconium is the preferred metallic cation—zirconium molybdate and zirconium tungstate have a high degree of insolubility to the eluants used to elute Mo-99/Tc-99m and W-188/Re-188 generators and provide a high yield of Tc-99m and Re-188, respectively. However, other metallic cations such as tantalum, polonium, platinum, niobium, hafnium, titanium, cerium, tin, and barium, and mixtures thereof may be used to prepare gels (or matrices) containing molybdenum or tungsten which have a low solubility to eluants used for generators of the present type and which have suitable elution characteristics. In addition, it may prove advantageous to prepare molybdate- or tungstate-containing gels including a mixture of metallic cations, for example, a mixture of zirconium and cerium.

Zirconium and molybdenum (or tungsten) cannot simultaneously be in solution in aqueous acids (pH less than about 6), aqueous bases (pH greater than about 8) or in aqueous solutions at neutral pH (pH between about 6 to about 8). Molybdenum and tungsten are unstable in aqueous acids; tungsten precipitates and molybdenum converts to polymolybdates. Zirconium hydrolyzes at neutral or basic pH to an insoluble hydroxide. The addition of basic molybdenum to acidic zirconium as suggested by Evans et al. in U.S. Pat. No. 4,280,053 and the addition of basic tungsten to acidic zirconium as suggested in Ehrhardt U.S. Pat. No. 4,859,431 partially solves this problem; the formation of the desired precipitate (zirconium tungstate or zirconium molybdate) is rapid compared to that of tungstic and polymolybdic acid, even though the overall pH is still acidic. However, this process involves a rate competition between the formation of the desired precipitate and the undesirable precipitates or polymers and additionally suffers from the other technical disadvantages previously mentioned.

In contrast, the zirconium (or other metallic cation or mixtures of cations) and/or the molybdate or tungstate is solubilized by a complexing agent and is present in the solution as a soluble dissolved complex in the process of the present invention. The dissolved zirconium complex is stable in aqueous base and in aqueous solutions at neutral pH, and the dissolved molybdate or tungstate complex remains stable in acid. Consequently, substantially clear acid solutions containing zirconium and a dissolved complex of molybdate or tungstate, substantially clear basic solutions containing molybdate or tungstate and a dissolved complex of zirconium, and substantially clear neutral solutions containing a dissolved complex of zirconium and a dissolved complex of molybdate or tungstate may be prepared.

The complexing agent may be any composition which (a) complexes zirconium (and cations of other metals useful in accordance with the present invention) at neutral pH or in base and/or complexes tungsten or molybdenum at neutral pH or in acid, and (b) decomposes to a gas or to a simple salt that is inert and/or may be easily washed away. Suitable complexing agents include formic acid, oxalic acid and metal carbamate salts, and peroxides such as peroxyacetate, peroxynitrate, peroxydisulfate, peroxysulfate and hydrogen peroxide. Hydrogen peroxide is preferred because of its germicidal properties and because metal peroxy complexes readily decompose to $O_2$ when heated to 30°-60° C. (Q. J. Nin et al., "Singlet Molecular Oxygen Generation from the Decomposition of Sodium Peroxotungstate and Sodium Peroxomolybdate", *Inorg. Chem.* Vol. 31, No. 16, 3472-3476 (1992); K. Bohme et al., "Generation of Singlet Oxygen from Hydrogen Peroxide Disproportionation Catalyzed by Molybdate Ions", *Inorg. Chem.*, Vol. 31, No. 16, 3468-3471 (1992)).

A substantially clear solution containing a metallic cation may be prepared by dissolving a soluble metal salt in an aqueous solution at neutral pH containing a complexing agent. Preferably the metallic cation is zirconyl ($ZrO^{+2}$), the soluble salt is zirconium nitrate, zirconium chloride or zirconium sulfate, and the complexing agent is a peroxide. Most preferably, the complexing agent is hydrogen peroxide and between about 0.05M and about 0.2M zirconium nitrate dissolved in about 10% $H_2O_2$ to provide a solution containing a dissolved zirconyl ($ZrO^{+2}$) peroxide complex. Sufficient peroxide should be present to result in stable complexation of all zirconium ions. Alternatively, the soluble zirconium salt may be dissolved in acid (without a complexing agent) as suggested by Evans et al., U.S. Pat. No. 4,280,053, and Ehrhardt U.S. Pat. No. 4,859,431 (which are incorporated herein by reference). If the zirconium nitrate is dissolved in acid, it is preferred that the pH of the acid be between about 1 and 4 and optimally between about 2 and 3.

A solution containing the low specific activity tungsten or molybdenum target is prepared by dissolving the target in base, in neutral solution or in neutral solution containing a complexing agent. Preferably, the tungsten target is sodium tungstate ($Na_2WO_4$), the molybdenum target is molybdenum metal or molybdenum trioxide ($MoO_3$), and the target is dissolved in neutral solution containing a complexing agent. Other tungsten and molybdenum targets such as tungsten trioxide and sodium molybdate may alternatively be used. Most preferably, between 0.15M and 0.6M sodium tungstate or molybdenum metal are dissolved in 5% hydrogen peroxide to provide a solution containing a dissolved tungstate peroxide or a dissolved molybdate peroxide complex. Sufficient $H_2O_2$ must be present to form stable complexes of all W or Mo and in the case of Mo metal targets, to also oxidize all Mo metal to molybdate ions. Alternatively, the molybdenum or tungsten target may be dissolved in base (without a complexing agent) as suggested by Evans et al., U.S. Pat. No. 4,280,053, and Ehrhardt U.S. Pat. No. 4,859,431. If the tungsten or molybdenum target is dissolved in base, it is preferred that the pH of the base be between about 9 and 12 and optimally between about 10 and 11.

The substantially insoluble gel is prepared by mixing the metallic cation-containing solution and the tungstate (or molybdate)-containing solution. The relative amounts of the two solutions are controlled such that a tungstate (or molybdate) precipitate is formed which contains approximately a 1:1 ratio of metallic cation to total tungsten (or molybdenum). A slight excess of zirconium is preferred, and a ratio of metallic cation to total tungsten (or molybdenum) up to at least about 1.2:1 does not appear to degrade the quality of the final product. Large excesses of zirconium, however, will increase the mass of the gel and are, therefore, not preferred.

A substantially clear mixture of the two solutions is formed when at least one of the two original solutions (i.e., either the metallic cation-containing solution or the tungstate (or molybdate)-containing solution) is at neutral pH and contains the tungstate (or molybdate) or metallic cation as a component of a dissolved complex. Preferably, the metallic cation-containing solution is at neutral pH and contains the metallic cation as a component of a dissolved peroxide complex. Most preferably, both solutions are at neutral pH and respectively contain the tungstate (or molybdate) and metallic cation as components of dissolved complexes.

Because the complexing agent holds the metallic cation in solution in base or at neutral pH and the tungstate or molybdate in solution in acid or at neutral pH, a mixture of the two solutions will remain clear until the dissolved complexes are decomposed. When desired, the dissolved complexes can be decomposed in a controllable, reproducible process to form an aqueous slurry containing zirconium tungstate, zirconium molybdate or other tungstate- or molybdate-containing precipitate. Peroxide complexes, for example, may be readily decomposed by heating the mixture to a temperature between about 30°-60° C. Formation of the gel precipitate occurs simultaneous with decomposition of the soluble complex(es). To speed up removal of excess water, the slurry is preferably heated to 100° C.-120° C. Care should be taken to not substantially exceed a temperature of about 120° C., however, because the final product (while appearing dry) contains water of hydration important to the ability to efficiently recover the pertechnetate (or perrhenate) daughter from the gel during subsequent elutions. The precipitate is collected, dried, and heated to at least 120° C. to remove trapped interstitial water.

Decomposition of the peroxide complexes results in the volatilization of oxygen which functions to control the size of particles formed during precipitation. This control of the size range of particles formed during precipitate formation avoids the burdensome, difficult and tedious task of crushing and grinding the precipitated dried gel in order to reduce its particle size sufficiently to obtain a powder which can be packed into an elution column. Advantageously, pH adjustment is not required during precipitation. Similarly, formic acid and carbamate complexes may be decomposed by heating and/or applying vacuum.

After the decomposition of the dissolved complexes, the resulting slurry may be directly transferred to an elutable container of a generator apparatus, then washed and dried to remove excess water to provide the substantially insoluble gel. Alternately, the gel may be dehydrated using a series of solvent treatments. For example, it is believed the gel containing columns may be rinsed with $H_2O$/Acetone mixtures using progressively increasing proportions of Acetone, followed by Acetone/ether mixture with progressively increasing proportions of ether. As another alternative, the slurry may be collected, dried and heated at a temperature, preferably about 120° C., in situ until a dry, free-flowing gel is formed and the gel is thereafter transferred to an elutable container of a generator apparatus and washed. As a further alternative, the gel may be collected by conventional filtration, washing and drying with the aid of suction, heat, or solvents such as ethanol or acetone. The dried gel is poured into a glass column of the type provided by Mallinckrodt Medical for Mo-99/Tc-99m generators. If desired, a "bed" of Alumina or hydrous zironium oxide (about 200 mg) may first be placed in the column to act as a final "scavenger" for any stray molybdate or tungstate which may be released from the gel. Typically, the bottom seals and needle (outlet) are already in place. After pouring in the gel, the top rubber seal, Al seal, and inlet needle are put in place and the column put in a generator "shell" containing an appropriate reservoir of saline or water eluant and plumbing valves, hoses, etc. Typically 50-100 ml eluant is passed through the column to remove any soluble molybdate or tungstate and to wash out any fine particles. Then, after a suitable period for the Re-188 or Tc-99m to "grow in", the generator is ready for use.

Suitable elutable containers include, for example, a glass column such as those used in standard chromatography which is then encased in a "shell" including appropriate lead shielding, associated plumbing and a reservoir of eluant, to form a generator assembly. An example of such a generator assembly is the Ultra TechneKow FM® generator, commercially available from Mallinckrodt Medical (St. Louis, Mo.). Alternatively, a separate sterile eluant reservoir may be supplied for each elution. Regardless of the type of reservoir used, it is desirable to keep the gel or matrix hydrated at all times.

Periodically, the daughter Re-188 or Tc-99m is conveniently eluted from the column using an eluant such as saline, for example NaCl or sodium sulfate. Physiological saline, preferably with a molarity of 0.15 is a preferred eluant.

Mo-99/Tc-99m and W-188/Re-188 generator devices made according to the present invention are quite compact and may be made using small masses of generator matrix. The Mo-99 and W-188 can be produced at a specific activity of at least about 2.5 Curie (Ci)/gram and 0.7-5 Curie (Ci)/gram, respectively. Thus, small (1-2 Curie size) generator columns containing volumes as low as 2 ml may be constructed using this process.

Performance of the technetium-99m or rhenium-188 generator may be expressed as elution efficiency. Elution efficiency may be calculated by measuring the amount of radioactivity of Tc-99m or Re-188 in the eluant divided by the amount of radioactivity of Tc-99m or Re-188 present on the generator column, immediately prior to elution. The radioactivity of the Tc-99m or Re-188 may be determined using standard instruments for measuring radioactivity including gamma ray spectrophotometers such as germanium detectors and sodium iodide scintillation spectrophotometers, which are capable of measuring low levels of radioactivity, or dose calibrators that can measure high levels of radioactivity. Elution efficiencies of Re-188 as high as 70-80% have been obtained using generators comprising gels prepared in accordance with the method of the present invention, with concentrations of Re-188 in the eluant of up to 3 mCi/ml and higher, determined immediately after elution.

The following Examples illustrate the process of the present invention.

EXAMPLE 1

99.79% isotopically enriched W-186 sodium tungstate (about 141 mg) irradiated in the Missouri University Research Reactor (MURR) for 1194 hours at a flux of about $3\times10^{14}$ neutrons/cm$^2$/sec m to produce about 20 mCi W-188 was combined with 565 mg non-radioactive "carrier" sodium tungstate (to simulate a larger target). The combined sodium tungstate was dissolved in a mixture of water (5 ml) and 30% hydrogen peroxide (1 ml) to produce a clear yellow solution of the peroxide complex of tungstate. A substantially clear solution containing a zirconyl peroxide complex was prepared by dissolving zirconium nitrate (502 mg) in a mixture containing water (12 ml) and 30% hydrogen peroxide (6 ml). The solution containing the peroxide complex of tungstate and the peroxide complex of zirconyl were mixed to form a mixture which was substantially clear and pale yellow in color, the mole ratio of Zr:W being about 1:1 in the mixture. This mixture was heated to decompose the hydrogen peroxide, destroying the peroxide complexes of Zr and W and producing a white precipitate of zirconium tungstate. Upon heating to dryness at 100°-120° C., a white powder was obtained. The powder was placed into a standard glass generator column supplied by Mallinckrodt Medical and eluted with normal saline solution (Mallinckrodt Mo-99/Tc-99m generator eluant) to obtain Re-188 in high yield (about 70-80%) and purity (about 1-2 ppm W per ml of eluant) in <10 ml of eluant. FIG. 1 is a plot of the percent elution yield of the resulting generator versus time.

EXAMPLE 2

Dry, non-radioactive sodium tungstate (about 551 mg dry) was dissolved in a solution previously formed by dissolving zirconium nitrate (about 501 mg) in a mixture of water (17 ml) and 30% hydrogen peroxide (7 ml). Upon dissolution of sodium tungstate, a substantially clear, pale yellow solution resulted. Heating this pale yellow solution produced a precipitate, which after drying at 120° C. formed a white powder of zirconium tungstate which was indistinguishable in appearance from the zirconium tungstate prepared in Example 1.

EXAMPLE 3

A first solution containing non-radioactive sodium tungstate (about 548 mg) dissolved in 5 ml water in the absence of peroxide was added to a second solution containing zirconium nitrate (501 mg) dissolved in a mixture of water (17 ml) and 30% hydrogen peroxide (7 ml) to produce a clear, pale yellow solution. Heating of this pale yellow solution yielded a white powder of zirconium tungstate which was indistinguishable in appearance from the zirconium tungstate prepared in Examples 1 and 2.

EXAMPLE 4

Molybdenum metal (about 180 mg) was dissolved in a mixture of water (5 ml) and 30% hydrogen peroxide (1 ml) to produce a first, clear yellow solution. This first solution was added to a second, clear yellow solution containing zirconium nitrate (504 mg) dissolved in water (12 ml) and 30% hydrogen peroxide (6 ml). Heating of the resulting mixture produced a precipitate which was collected and dried at 120° C. to form a yellow powder of zirconium molybdate. The zirconium molybdate had a texture and particle size comparable to the zirconium tungstate prepared as set forth in Examples 1, 2 and 3.

EXAMPLE 5

Natural molybdenum metal (about 180 mg) was irradiated in a thermal neutron flux of $4\times10^{13}$ neutrons/cm$^2$/sec to produce about 20 microcuries of Mo-99. The irradiated molybdenum was dissolved in a mixture of water (5 ml) and 30% hydrogen peroxide (2 ml) to produce a first clear yellow solution. A second, substantially clear, pale yellow solution containing zirconium nitrate (about 504 mg) dissolved in a mixture of water (12 ml) and 30% hydrogen peroxide (6 ml) was also prepared. The first and second solutions were mixed and the resulting mixture was heated to decompose the peroxide complexes and produce a yellow precipitate. Continued heating at 120° C. for 3 hours produced an off-white gel of zirconium molybdate. After suspension and decantation with water to remove very fine particles which might tend to clog the glass frit of the column, the gel was loaded into a standard Mallinckrodt Mo-99/Tc-99m generator column. Subsequent elution with saline produced very pure solutions of Tc-99m in about 50% yield containing no detectable Mo-99 contamination, as assayed by germanium gamma spectroscopy.

EXAMPLE 6

Non-radioactive sodium tungstate (about 563 mg) was dissolved in a mixture containing 30% hydrogen peroxide (1 ml) and water (5 ml) to produce a clear solution. This clear solution was added to a second solution containing zirconium nitrate (about 500 mg) dissolved in concentrated hydrochloric acid (1 ml) and water (5 ml) to produce a pale yellow solution. Upon heating, this mixture yielded a zirconium tungstate precipitate which was then dried at 120° C.; the dried gel was comparable in appearance to the zirconium tungstate gel produced in Example 1.

EXAMPLE 7

Non-radioactive sodium tungstate (about 367 mg) was dissolved in 30% hydrogen peroxide (1 ml) and water (3 ml) to produce a first, clear, yellow solution. Stannic chloride (about 397 mg) was dissolved in 30% hydrogen peroxide (1 ml) and water (3 ml) to produce a second, colorless solution. Upon mixing of the two solutions and heating, a gelatinous precipitate resulted which upon further heating at 120° C. yielded a pale yellow gel.

EXAMPLE 8

Non-radioactive molybdenum metal (about 199 mg) was dissolved in 30% hydrogen peroxide (6 ml) and water (7 ml) to form a first, clear, yellow solution. This first solution was added to a second solution containing stannic chloride (about 827 mg) dissolved in hydrogen peroxide (1 ml) to yield a clear, yellow solution which upon heating yielded a gel precipitate, which when dried at 120° C. produced a grey, flaky gel.

EXAMPLE 9

Non-radioactive sodium tungstate (about 532 mg) was dissolved in 1% aqueous solution (6 ml) of formic acid to yield a first, clear, colorless solution. A second, clear, colorless solution was prepared by dissolving zirconium nitrate (about 478 mg) in 1% aqueous formic acid (18 ml). Upon mixing these solutions, a white precipitate resulted immediately. Heating at 120° C. to dryness produced a white precipitate identical in appearance to the zirconium tungstate gels produced using hydrogen peroxide as the complexing agent as described in Example 1.

EXAMPLE 10

Zirconium nitrate (about 510 mg) was dissolved in 30% hydrogen peroxide (6 ml) and water (12 ml) to produce a first, substantially clear, pale yellow solution. A second, clear, colorless solution (pH about 13) was prepared by dissolving sodium tungstate (about 517 mg) in base (0.1N NaOH; 6.0 ml). Addition of the basic tungstate to the peroxide complex of zirconium resulted in a substantially clear, pale yellow solution which, upon heating yielded a precipitate. After heating to dryness at 100°-120° C., the precipitate was identical in appearance to the gel produced in Example 1.

In view of the above, it will be seen that the several objects of the invention are achieved.

As various changes could be made in the above compositions and processes without departing from the scope of the invention, it is intended that all matter contained in the above description be interpreted as illustrative and not in a limiting sense.

We claim:

1. A process for preparing gels containing ($\eta,\gamma$) Mo-99 or ($\eta,\gamma$) W-188 comprising:

providing a substantially clear solution containing a metallic cation and an anion comprising ($\eta,\gamma$) W-188 or ($\eta,\gamma$) Mo-99, the metallic cation being present in the solution as a component of a dissolved complex of the metallic cation and a complexing agent and/or the anion being present in the solution as a component of a dissolved complex of the anion and a complexing agent, decomposing the dissolved complex(es) to form a slurry containing a precipitate of the metallic cation, and collecting the precipitate to provide a substantially insoluble gel.

2. A process as set forth in claim 1 wherein the substantially clear solution is at neutral pH.

3. A process as set forth in claim 1 wherein the metallic cation is present in the solution as a component of a dissolved peroxide complex.

4. A process as set forth in claim 1 wherein the metallic cation is zirconyl, the zirconyl ion is present in the solution as a component of a dissolved peroxide complex, and the substantially clear solution is at neutral pH.

5. A process for preparing a radionuclide generator for producing Tc-99m or Re-188 comprising the steps:

preparing a clear solution containing a metallic cation and an anion comprising W-188 or Mo-99, the metallic cation being present in the solution as a dissolved complex of the metallic cation and a complexing agent and/or the anion being present in the solution as a dissolved complex of the anion and a complexing agent, decomposing the dissolved complex(es) to form a slurry containing a precipitate of the metallic cation and the anion, and transferring the precipitate to an elutable container of a radionuclide generator.

6. A process as set forth in claim 5 wherein the substantially clear solution is at neutral pH.

7. A process as set forth in claim 5 wherein the metallic cation is present in the solution as a component of a dissolved peroxide complex.

8. A process as set forth in claim 5 wherein the metallic cation is zirconyl, the zirconyl ion is present in the solution as a component of a dissolved peroxide complex, and the substantially clear solution has a pH between about 6 and about 8.

9. A process as set forth in claim 5 wherein the complexing agent is hydrogen peroxide.

10. A process as set forth in claim 5 wherein the clear solution is heated to a temperature between about 30° C. and 120° C. to decompose the dissolved complex(es).

11. A process as set forth in claim 5 wherein the anion is present in the solution as a dissolved complex.

12. A process as set forth in claim 5 wherein the metallic cation is present in the solution as a component of a first dissolved complex and the anion is present in the solution as a component of a second dissolved complex and the substantially clear solution has a pH between about 6 and about 8.

13. A process as set forth in claim 1 wherein the complexing agent is formic acid.

14. A process for preparing a radionuclide generator for producing Tc-99m or Re-188 comprising the steps:

preparing a clear solution containing a metallic cation and an anion comprising W-188 or Mo-99, the metallic cation ion being present in the solution as a component of a first dissolved peroxide complex, and/or the anion being present in the solution as a component of a second dissolved peroxide complex, decomposing the dissolved complex(es) to form a slurry containing a precipitate of the metallic cation and the anion, and transferring the precipitate to an elutable container of a radionuclide generator.

15. A process as set forth in claim 14 wherein the clear solution is heated to a temperature between about 30° C. and 120° C. to decompose the dissolved complex(es).

16. A process as set forth in claim 14 wherein the metallic cation is zirconyl and is present in the solution as a dissolved peroxide complex.

17. A process as set forth in claim 8 wherein the anion is present in the solution as a dissolved complex.

18. A process as set forth in claim 8 wherein the metallic cation is zirconyl, the zirconyl ion is present in the solution as a component of a first dissolved complex and the anion is present in the solution as a component of a second dissolved complex.

19. A process as set forth in claim 18 wherein the substantially clear solution has a pH between about 6 and about 8.

20. A process as set forth in claim 14 wherein the substantially clear solution has a pH between about 6 and about 8.

* * * * *